US000001183H

United States Statutory Invention Registration [19]

[11] Reg. Number: H1183

[43] Published: May 4, 1993

Zitko et al.

[54] LASER SCANNER METHOD FOR DETERMINING NUMBER AND SIZE OF PARTICLES

[76] Inventors: Frank Zitko, 210 Flynn Ave., Number 6, Mountain View, Calif. 94043; by Hana A. Chandler, conservator, 550 Oxford Ave., Number 3, Palo Alto, Calif. 94306; Jack S. Smith, 1388 River Rch. Cir., Saratoga, Calif. 95070; Kevin W. R. Crispin, 133 Redwood Dr., Loma Mar, Calif. 94021

[21] Appl. No.: 811,210

[22] Filed: Dec. 19, 1991

[51] Int. Cl.[5] ..... G01V 9/04

[52] U.S. Cl. ..... 382/1; 73/865.5; 250/222.2; 356/338

[58] Field of Search ..... 382/22, 56, 21, 26, 382/20, 19, 9, 25

[56] References Cited

U.S. PATENT DOCUMENTS

| | | | |
|---|---|---|---|
| 3,805,028 | 4/1974 | Morton | 382/26 |
| 4,183,013 | 1/1980 | Agrawala et al. | 382/26 |
| 4,189,711 | 2/1980 | Frank | 382/26 |
| 4,624,013 | 11/1986 | Urushibata | 382/26 |
| 4,630,306 | 12/1986 | West et al. | 382/21 |
| 4,791,676 | 12/1988 | Flickner et al. | 382/22 |

OTHER PUBLICATIONS

National Bureau of Standards Special Publication 400-24 entitled Semiconductor Measurement Technology: A Laser Scanner for Semiconductor Devices, by David E. Sawyer and David W. Berning, issued in Feb. of 1977.

*Primary Examiner*—Bernarr E. Gregory

[57] ABSTRACT

A method for counting the number and measuring the area of solid particles ranging in size from one micron to one millimeter across contained in a sample of a solids-loaded plastic matrix material. The method utilizes an interfacing electronics package to place a laser scanner under computer control.

1 Claim, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LASER SCANNER METHOD FOR DETERMINING NUMBER AND SIZE OF PARTICLES

FIELD OF THE INVENTION

This invention pertains to methods used for the counting and measuring of solid particles contained within a cross-sectional sample of a solids-loaded plastic matrix material (such as solid particles suspended within the cured polymer matrix of a rocket motor solid propellant material), and more particularly to a method utilizing a laser scanner to count the number and measure the projected area of particles located within a cross-sectional sample of material and ranging in span from one micron to one millimeter across.

BACKGROUND OF THE INVENTION particle size and distribution affect the processability and rheological characteristics of solids-loaded plastic matrix materials; also, for solid rocket motor propellant materials, the burn rate is significantly affected. The kinds of solid particles (e.g., cyclotetramethylenetetranitroamine {HMX}, ammoniumperchlorate {AP}, and metallic aluminum powder) distributed within the polymer matrix of a multi-component solid rocket motor propellant material can usually be made distinguishable from one another by various techniques. For example, aluminum particles are not crystalline and are often spheroid; HMX solids are more readily decomposable by electron beam irradiation at 8 to 30 kilovolts than AP solids. Also refractive index masking oils can mask particles with the same refracting index from view when evaluation is being carried out under an optical microscope.

It is impractical to optically count particles smaller than about two microns across; furthermore optical methods for sizing and counting particles are labor intensive, and refractive index matching oils are often carcinogenic. Therefore there is a need for a method that will automate the counting and area measuring of particles within the range of from one micron to one millimeter across.

SUMMARY OF THE INVENTION

The instant method for determining the number and projected cross-sectional area of particles utilizes a prior-art moving laser-light spot scanner apparatus (hereinafter referred to simply as a laser scanner) developed at the Electronic Technology Division, Institute for Applied Technology, of the National Bureau of Standards (see NBS Special Publication 400-24 entitled "Semiconductor Measurement Technology: A Laser Scanner for Semiconductor Devices" by David E. Sawyer and David W. Berning, issued in February of 1977). The NBS Special Publication 400-24, which is incorporated herein by reference, contains a detailed description of that apparatus. The kind of microscope used in that apparatus is sometimes referred to as a confocal microscope (as it uses only a single ray of light).

A conventional optical microscope technique would entail flooding a field of view with light and then looking at reflections with an imager such as a charge control device (i.e., CCD). Stray light from other points in the field of view would also fall upon the same pixel detector, making edge detection difficult by effectively reducing the signal to noise ratio. A confocal microscope is superior to the conventional optical microscope technique for the task of detecting particle edges.

In the instant method, a laser beam of 632 nm wavelength is focused to a 1 um diameter spot. That spot is then raster scanned across a viewing surface on a sample of material. Electrical current, produced by light reflected from a pixel and thence directed to a photocell, is then recorded.

DESCRIPTION OF THE PREFERRED EMBODIMENT

Figure 1:
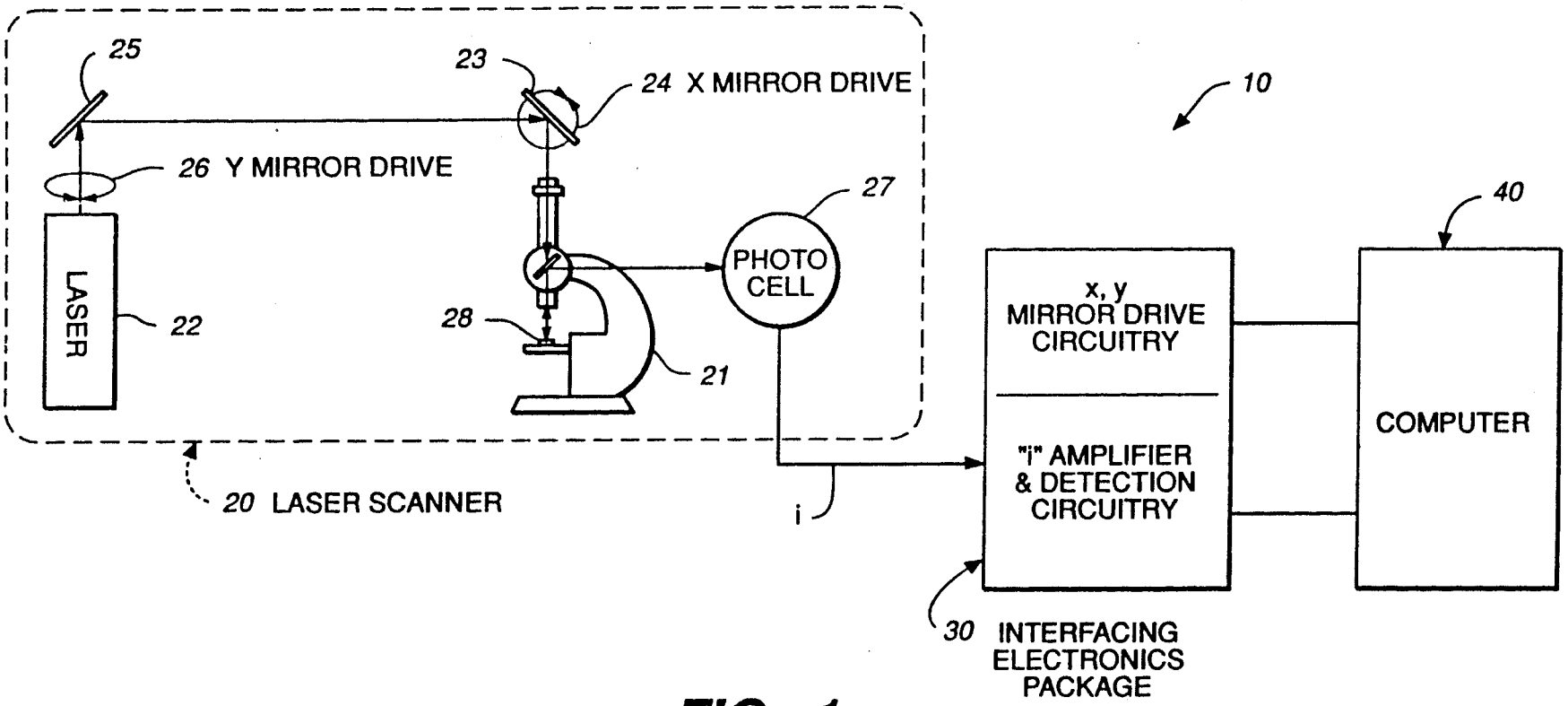
FIG. 1 shows a representative block diagram of the particle size detector apparatus 10 utilized in practicing the method of the instant invention.

Referring now to the drawings wherein like reference numerals are used to designate like or corresponding parts throughout the various figures thereof, there is shown in FIG. 1 a representative block diagram of the particle size detector apparatus 10 used for practicing the method of the instant invention. The key to automating the process of counting and measuring of solid particles 50 is the placing of the laser scanner 20 under the control of a computer 40. To accomplish this task, an interfacing electronics package 30 is placed between the laser scanner 20 and the computer 40. The interfacing electronics package 30 provides the electrical power (to pivot each mirror) to the X mirror drive 24 and the Y mirror drive 26. The computer 40 is used to select the position of the Y mirror 25 and to signal the X mirror 23 to sweep. Laser light is focused onto a pixel on a sample 28 and a portion of the reflected light is caused to be incident upon a photocell 27. The photocurrent (i) produced by the photocell 27 is then sent to the interfacing electronics package 30 for processing. The results of the processed signal are then sent to the computer 40 for storage, retrieval and analysis.

The photocurrent signal is amplified by the interfacing electronics package 30 prior to evaluation. At this point the photocurrent could have been immediately sent through an analog to digital (a/d) converter; this word could then have been sent to the computer 40 and stored. That approach could be a very time consuming task depending upon the resolution desired (number of pixels per unit area). The instant method avoids this step by using a data compression scheme.

For the particular kind of particle 50 that is to be scanned, the human operator will enter into the computer 40 is predetermined numerical threshold value (I) of photocell current, which will be used to discriminate between whether or not a pixel is on matrix material or on particle material. For this description of the preferred embodiment it is assumed that the kind of particle 50 to be scanned is more reflective of the laser light than the surrounding matrix material, hence a photocurrent level (i) that is higher than the threshold level (l) will indicate that the laser light spot is falling on a pixel that is located on a particle 50.

The human operator will also enter information into the computer 40 to define the location on the sample 28 of the field that is to be scanned. For example, assuming that a rectangular field is desired, the initial and final X-coordinate values (i.e., XI and XF) and the value of the X-axis scanning increment (i.e., $\Delta x$) will be entered, as will the corresponding values related to the Y axis (i.e., YI, YF, and $\Delta y$); for most cases the numerical value of the X and Y stepping increments (i.e., $\Delta x$ and $\Delta y$) will be the same. The computer 40 will then make calculations and transfer information into the interfacing electronics package 30 as required; for example, the first few steps of the flow chart shown in FIG. 5 show the computer process for calculating each incremental value of y and an integer index number ($p=1, 2, 3, \ldots$) for each horizontal X-axis sweep line corresponding to a particular value of y.

Figure 4:
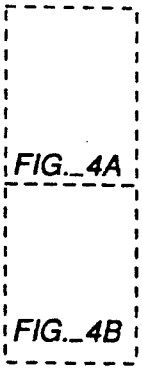
FIG. 4, made up of FIGS. 4A–4B, is an example of a flow chart pertaining to the operation of the interfacing electronics package 30.
Figure 4A:
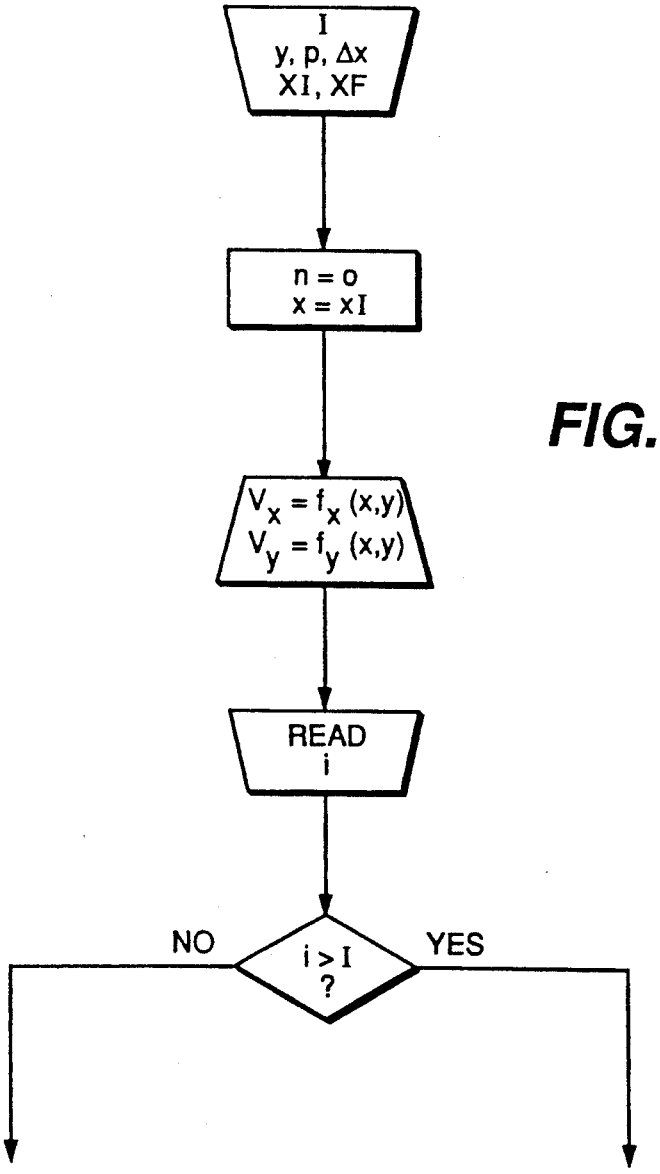
Figure 4B:
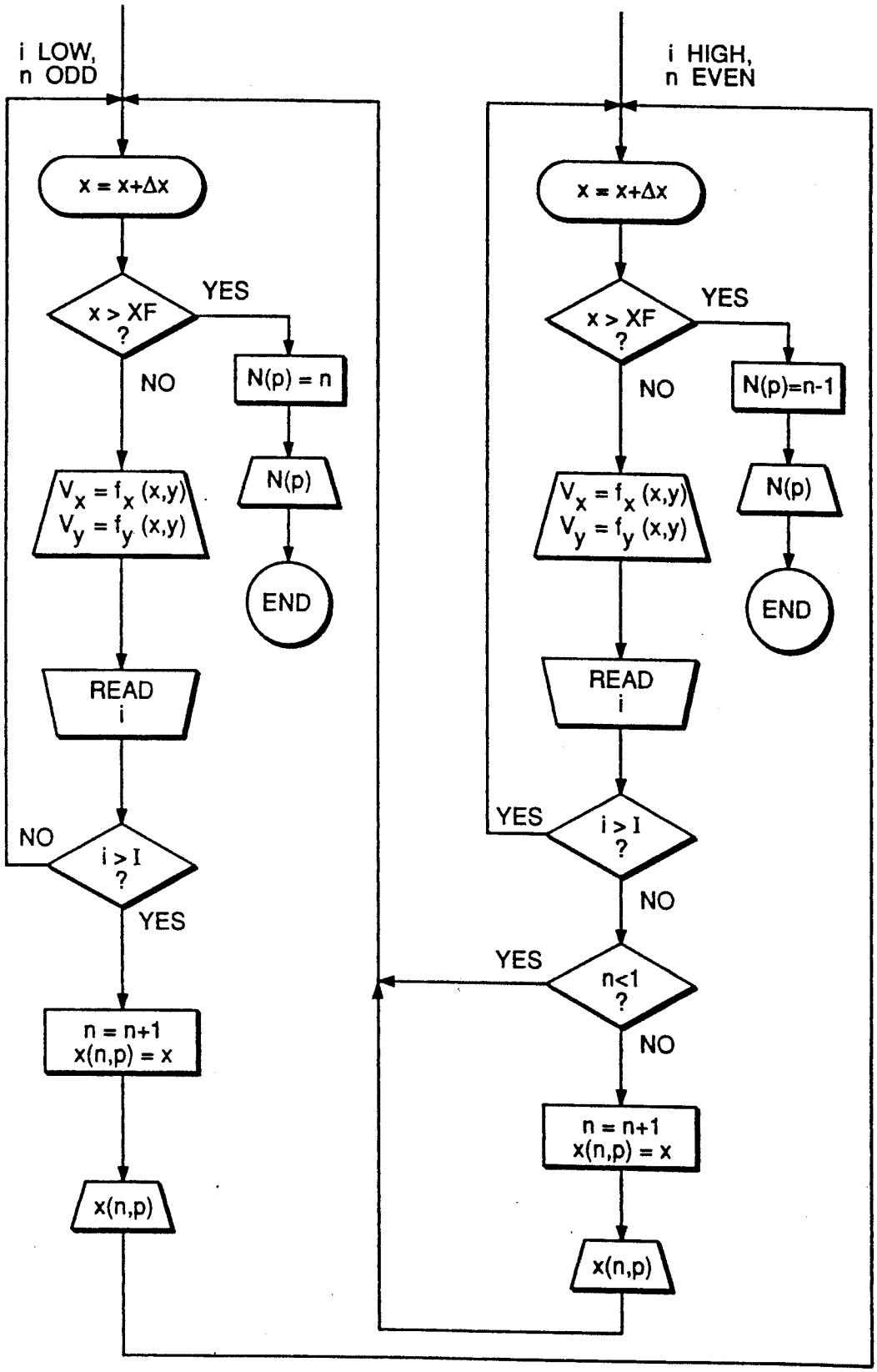

The sequence of events for scanning an entire field is as follows (refer to FIG. 4, the flow chart for the interfacing electronics package 30).

At the very beginning of every X-axis sweep ($n=0$, along a horizontal line having a particular value of y with a corresponding Y-line index number p) the values of voltages $V_x$ and $V_y$ to position the laser light spot on the pixel at the initial X and Y coordinates are calculated, and these voltages then sent to the mirror drives 24 and 26 to position the laser spot on the first pixel at the start of the horizontal line. The value of the photocurrent i (corresponding to the light reflected from the first pixel) is then compared to the threshold value l to determine if the first reading is above or below the threshold value. If the value of l is above the threshold value (starting off high) the decision loop on the right side of FIG. 4 is entered, the value of x is incremented (and hence new values of $V_x$ and $V_y$ are calculated and the mirrors 23 and 25 pivoted), and readings of i are taken; this process is repeated until i drops below l, at which point the decision loop on the left side of FIG. 4 is entered (starting off low). This initial processing is done so that the first value ($n=1$) of x on each line, i.e. x(1,p), that is sent to the computer 40 (along with all subsequent odd values, e.g. x(3,p), x(5,p)) will be a "high" transition representing an initial crossing of a particle edge when sweeping from matrix material onto particle material. After a particle edge is crossed (for either a high or a low transition) and a value of x(n,p) is sent to the computer 40, a switch is made from the decision loop on one side of the flow chart to the other side until the end of the horizontal scanning line is reached. All odd-numbered ($n=1, 3, 5, \ldots$) values of x will represent "high" transitions; all even-numbered values of x will represent low transitions (crossings of a particle edge when sweeping from particle material back into matrix material). If the last transition should be odd-numbered, it will be dropped from the string of values of x sent to the computer 40 (so that only pairs of values of x, representing initial and final values of x for each particle strip lying on scanning line number p, end up being sent to the computer 40 from the interfacing electronics package 300. The total number of crossings N(p), i.e., the total number of discrete values of x on the line p that are sent to the computer 40, is also calculated.

Figure 5:
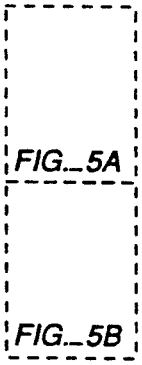
FIG. 5, made up of FIGS. 5A–5B, is an example of the flow chart pertaining to the operation of the computer 40 for performing the first part of the data analyses.
Figure 5A:
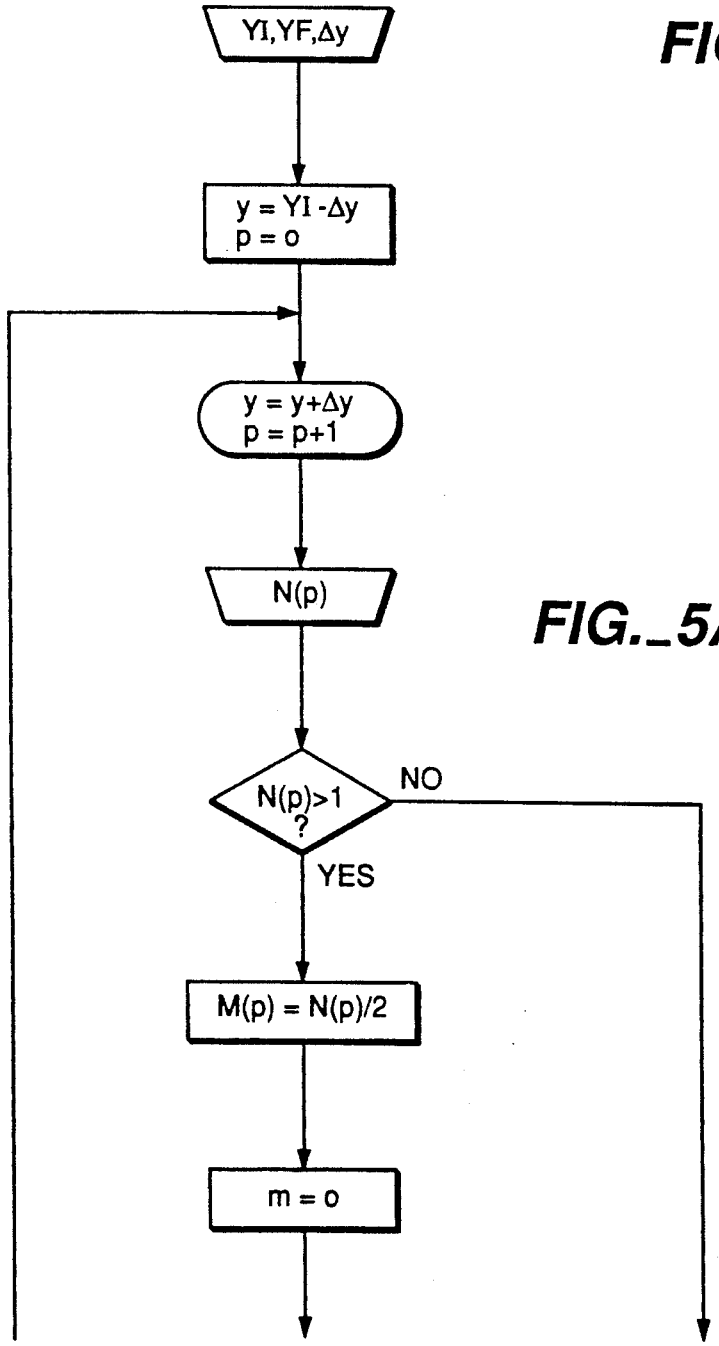
Figure 5B:
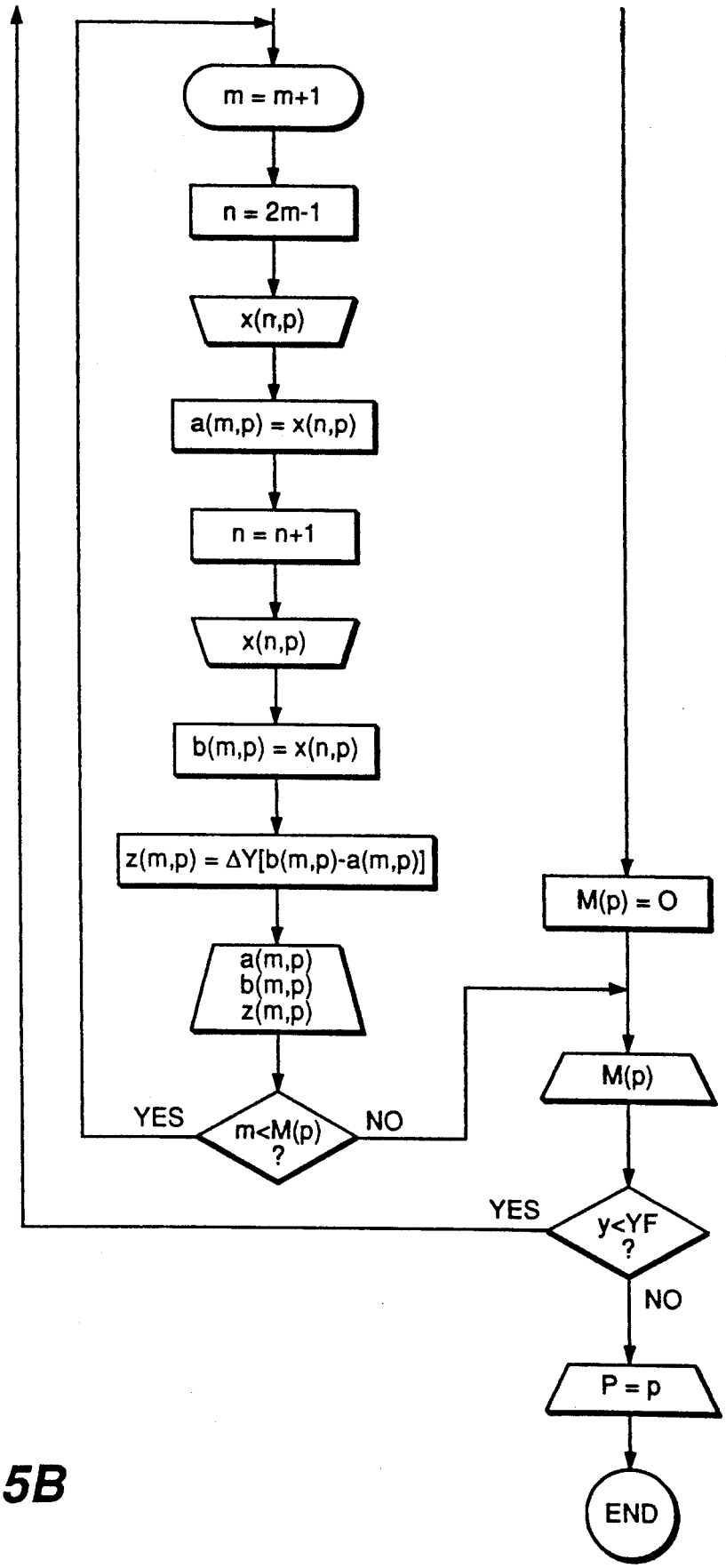

After all the data corresponding to transitions along a particular (i.e. p) horizontal scanning line has been sent to the computer 40, the computer 40 performs the first phase of data analysis as represented by the flow chart shown in FIG. 5 and then stores the processed data. The computer 40 calculates M(p) (the number of particle strips 54 lying on line p), and assigns successive integer numbers ($m=1, 2, 3, \ldots$) to each particle strip 54 on the line 52 (see FIG. 2). The initial (a) and final (b) values of x (i.e., leading 56 and trailing 58 edges) for each particle strip (m) on a particular line (p) are stored in arrays a and b, as a(m,p) and b(m,p). The area z(m,p) of each particle strip 54 is stored in array z. The computer 40 then directs the interfacing electronics package 30 to make the next X-axis sweep (unless the final horizontal line, corresponding to $y=YF$, was previously completed). After the data for the final horizontal line has been processed, the computer 40 stores the number (P) representing the total number of horizontal lines scanned.

Figures 6, 6A:
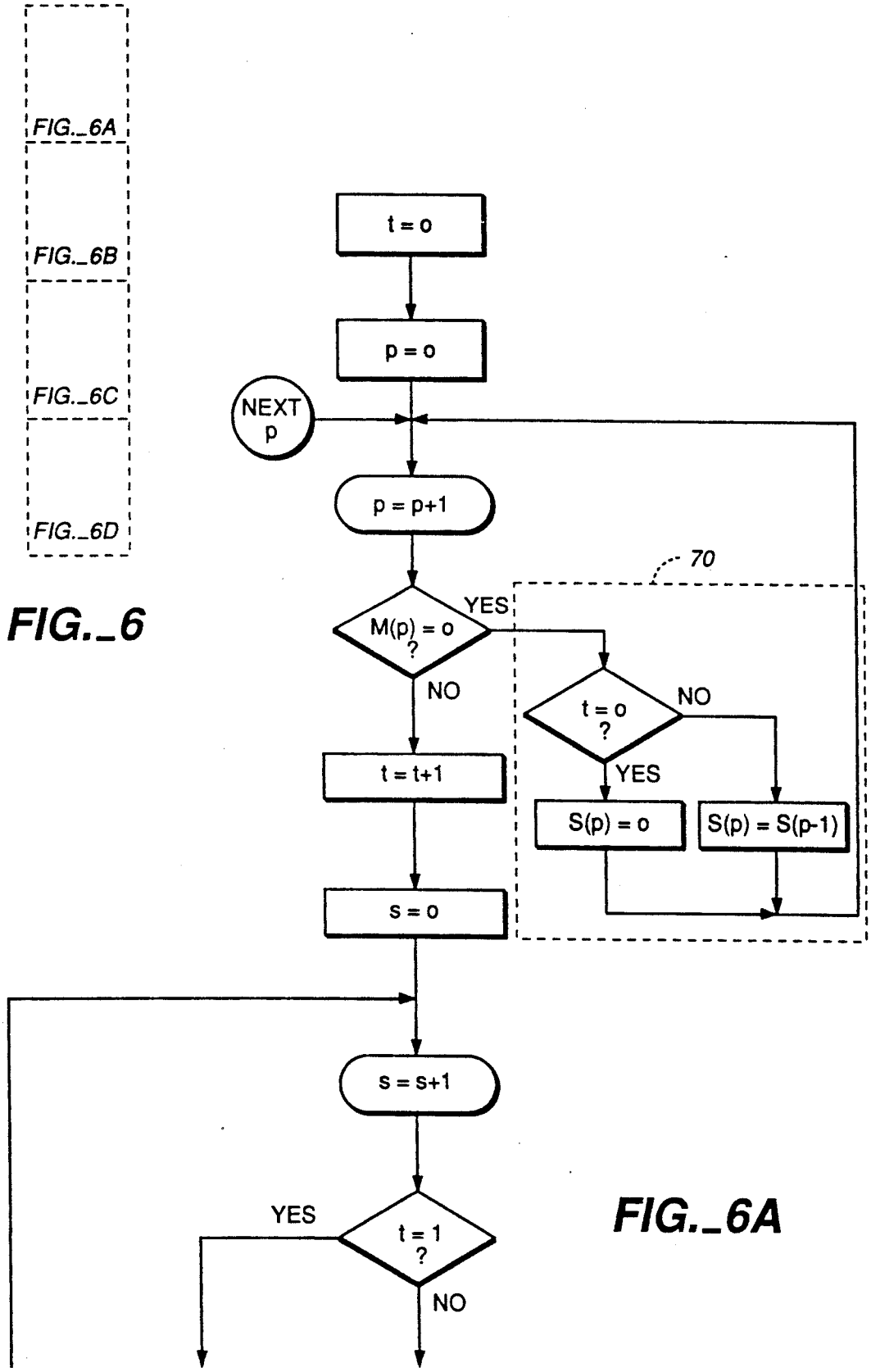
FIG. 6, made up of FIGS. 6A–6D, is an example of a flow chart pertaining to the operation of the computer 40 for performing the second part of the data analyses (reconstruction).
Figure 6B:
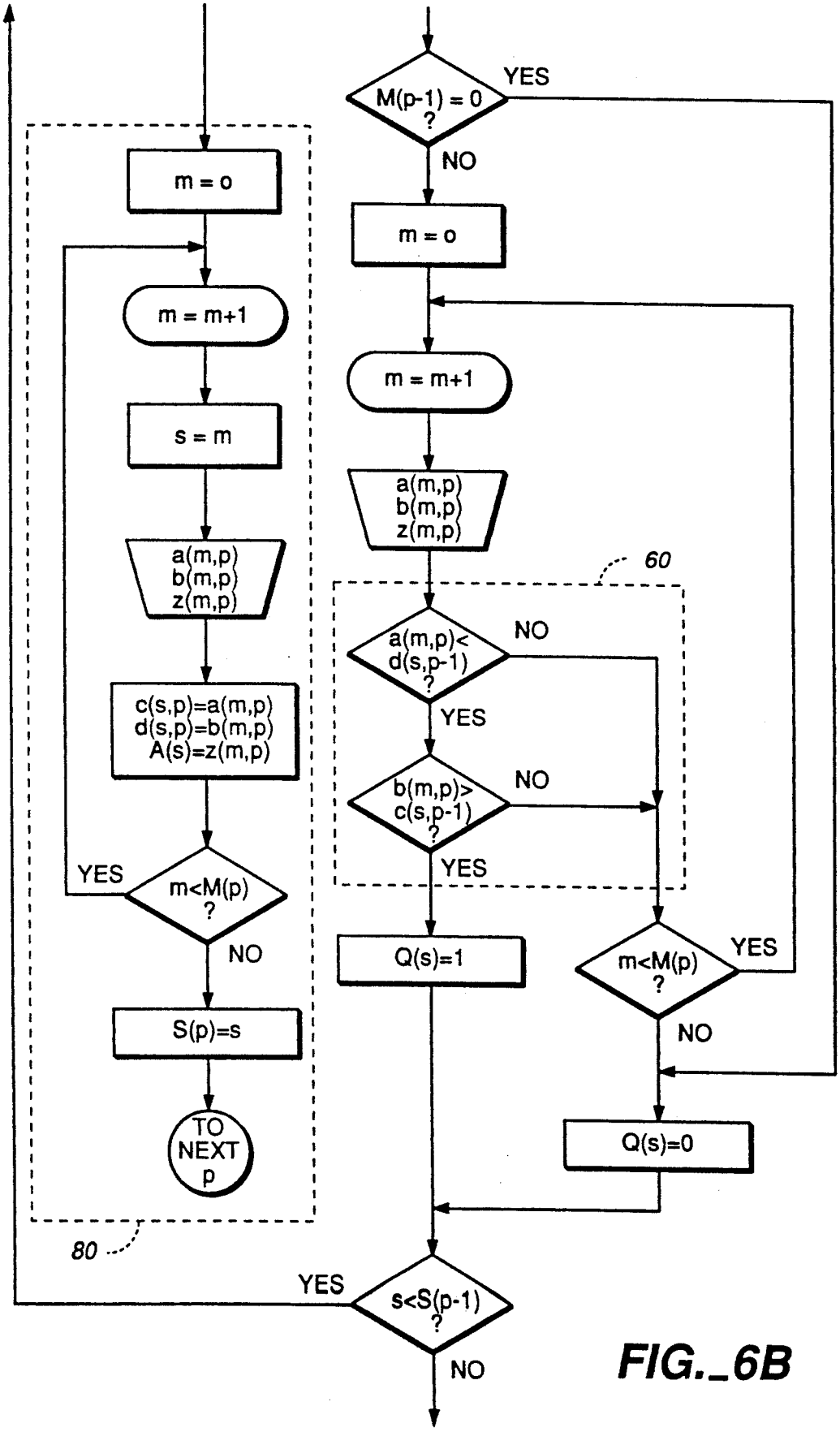
Figure 6C:
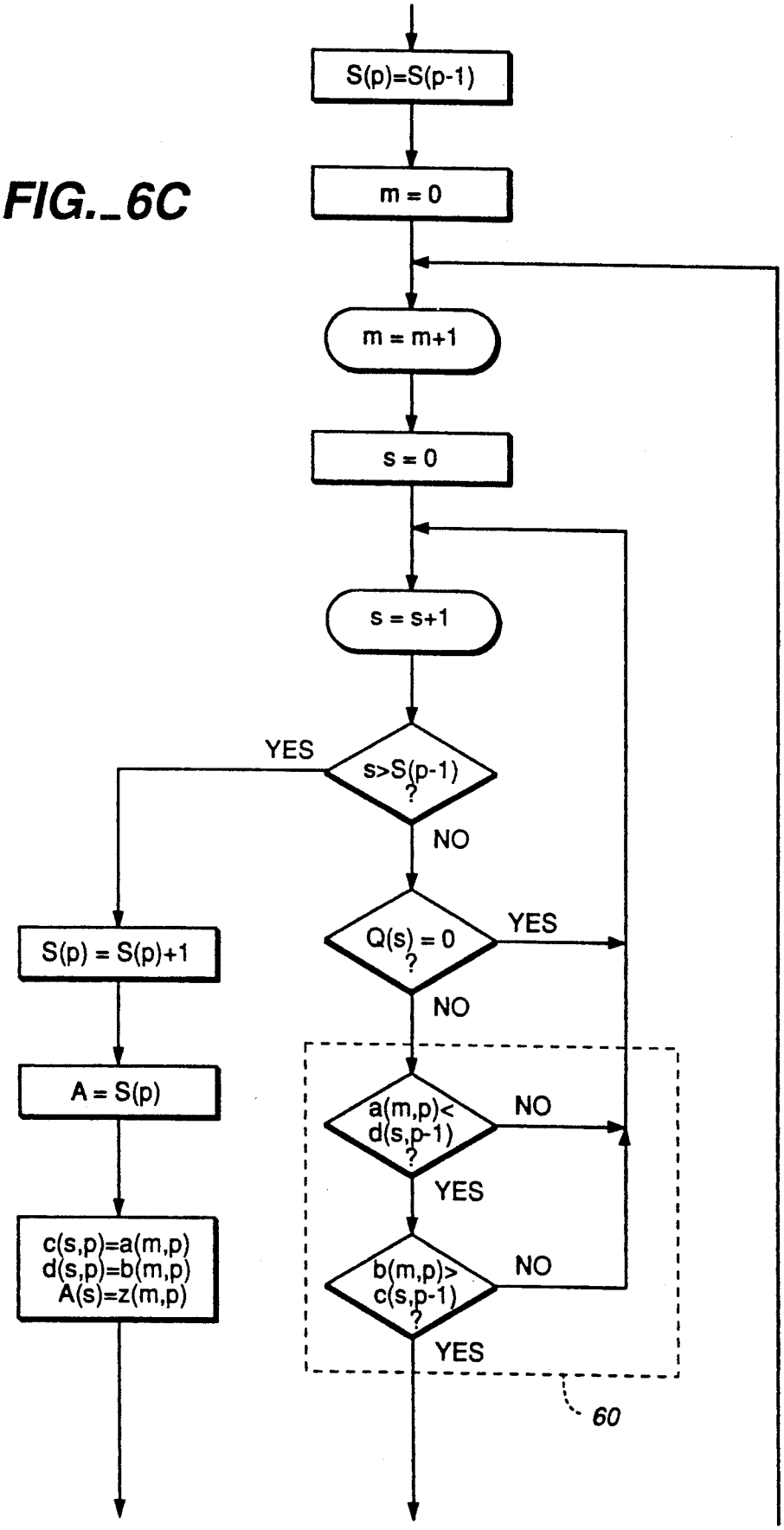
Figure 6D:
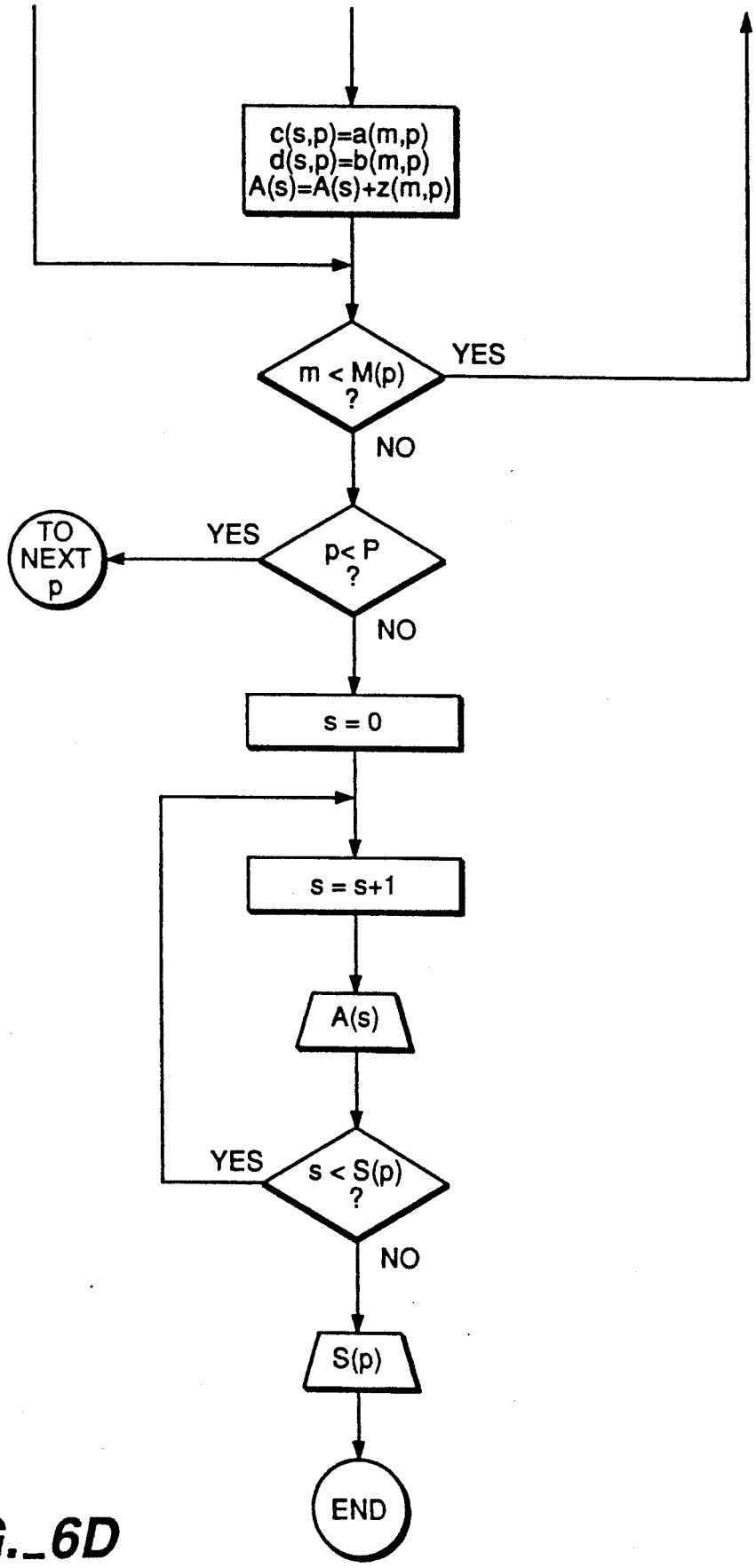

With data for all the particle strips 54 {a(m,p), b(m,p), and z(m,p)} stored in arrays in the computer 40 for every numbered strip (m) on each horizontal scanning line (p), it is now necessary to reconstruct the data in order to perform counting of the number of particles 50 and measuring of the area of each particle. Each whole particle 50 is identified by a unique integer index number represented by the letter "s"; the total number of particles counted up to and including a scanning line p is designated S(p); the total number of particles (in a scanned sample area) is S; the cross-sectional area of a whole particle is A(s). An example of a procedure for doing this is set forth in the flow chart shown in FIG. 6 (FIGS. 6A and 6B being the upper half, FIGS. 6C and 6D being the lower half). This flow chart is essentially a large outside do-loop indexed by "p", within which is contained two (in sequence) nested double do-loops. The first nested double do-loop is shown in FIGS. 6A and 6B; an innermost "m" do-loop within a "s" do-loop. The second nested double do-loop is shown in FIGS. 6C and 6D; an innermost "s" do-loop within a "m" do-loop. Part of the process preformed within this flow chart entails taking the stored data indexed by reference to strips 54 on a line 52 (m and p) and converting it to data indexed by reference to particle 50 number (s), inasmuch as the desired output of the instant example flow chart is the cross-sectional area {A(s)} of each particle 50, and the total number of particles {S} within the scanned area.

At the start of the flow diagram at the top of FIG. 6 (prior to entering the main "p" do-loop) the value of an indicator "t" and the value of the index "p" are set to zero. The indicator "t" is a testing counter that does not exceed zero until the very first scanning line p that contains at least one particle strip (i.e., where M(p) is 1 or higher) is encountered; for that first particle-containing line the value "t" is set equal to 1. The special processing of data for that first line (i.e., the p line where $t=1$) will be discussed after first discussing the processing of lines in general.

Figure 2:
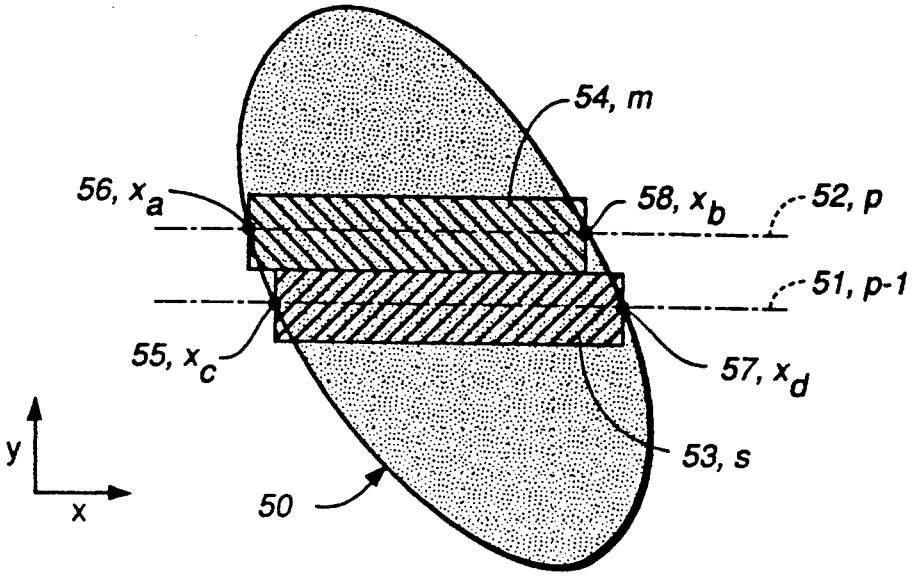
FIG. 2 shows a typical particle 50 with representative adjacent upper 54 and lower 53 horizontal particle strips; each particle 50 is associated with a unique integer particle number "s".
Figure 3:
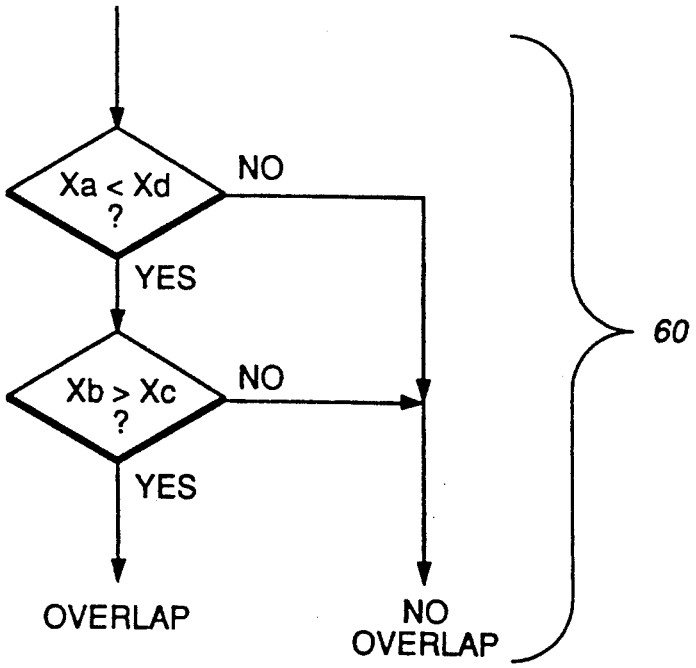
FIG. 3 shows a typical "overlap/no overlap" decision test portion 60 of a flow chart.

The function of the first nested double do-loop (FIGS. 6A and 6B) is to test each particle strip 53 on a lower line 51 {i.e., line ($p-11$)} to see if it overlaps with any particle strip 54 on the immediately adjacent line 52 above it {i.e., line (p)}. FIG. 2 shows the physical relationship of two such strips 53 and 54 within a whole particle 50 (each whole particle 50 is indexed by a unique integer number "s"). The strips 53 on the lower line 51 {line (p−1)} have already been indexed by particle 50 number (s) and line 51 number (p−1), rather than by strip number (m) and line number (p). Hence strips 53 on the lower line 51 have leading 55 and trailing 57 edges (values of x) designated respectively as c(s,p−1) and d(s,p−1); the leading 56 and trailing 58 edges (values of x) of strips 54 on the upper line 52 are still designated as a(m,p) and b(m,p), being indexed with respect to a strip number m on line p. FIG. 3 is an example of a typical logic test 60 for testing whether two strips overlap; this logic test 60 is at the center of each of the two nested double do-loops (hence appearing in both FIGS. 6B and 6C). As each particle strip 53 on lower line p−1 (indexed by s) is checked against every strip 54 on upper line p (indexed by m) it is obvious why "m" is the innermost do-loop index for this first overlap testing. If a lower-line strip 53 (i.e., indexed by s and p−1) overlaps with any strip 54 on the adjacent upper line (i.e., indexed by m and p), the value of a qualifying indicator Q for that corresponding whole particle 50 (having the index s) is set equal to 1 (i.e., Q(s)=1); if not, Q(s)=0. Once Q(s) becomes zero for a particular s whole particle 50, it logically follows that the boundary of that whole particle does not extend above the line −1.

For a horizontal scanning line p line having no "m" strips {M(p)=0}, it is obvious that the boundaries of all the whole particles that exist below that line (all particles from S(1) up through S(p−1) do not extend into line p; hence both logic tests 60 (FIGS. 6B and 6C) for multiple individual strips can be avoided (thus directly indexing the "p" do-loop, as shown within the block 70 of FIG. 6A). Both logic tests 60 are bypassed for a line p that contains strips if the preceding line p−1 contains no strips.

After the upper half of the flow chart (FIGS. 6A and 6B) have been completed (for a given scanning line p), qualifying values of Q(s)=1 or Q(s)=0 will have been assigned to all particles 50 lying beneath that line. The lower half of the flow chart (FIGS. 6C and 6D) will now be entered (still at the same value of p). Prior to entering the second double nested do-loop, S(p) will be initially assigned the same value (the value for the total number of whole particles) as were counted up to by the end of the preceding line {i.e., S(p−1)}, and the value of the index "m" for the outer loop set to zero.

Within the double nested do-loop shown in FIGS. 6C and 6D, overlap testing is performed once again. This time the order of testing is reversed from the order used in FIGS. 6A and 6B; each strip 54 (indexed by m) on the upper line p is tested to see if it overlaps with any qualified particle strip 53 (indexed by a s) on the lower line p−1; the qualification being that the lower strip 53 (indexed by s) must have an associated value of Q(s)=1. Less testing is done by the logic test 60 in FIG. 6C than the logic test 60 in FIG. 6B, as unqualified lower level strips 53 (having values of the index s where Q(s)=0) are not tested. Hence every qualified lower strip 53 tested will be assured of overlapping with one of the upper level strips 54. When an upper strip (indexed by m and p) is found to overlap with a lower strip (indexed by s and −1), the leading 56 and trailing 58 values of x for the upper strip 54 {a(m,p) and b(m,p)} are assigned to arrays c and d {as c(s,p) and d(s,p)} and hence become associated with the whole particle 50 that is identified by the index s; the area of the particle 50, A(s), is then incremented upwards by the area z(m,p) of the upper strip 54. When the X-axis locations (leading and trailing edges) and the area of a strip 54 on a scanning line p have been transferred by changing the identifying references from strip and line number to particle and line number, the data for that strip has been reconstructed. If, after looping through the "s" loop through the value of s=S(p−1), an upper strip 54 (indexed by m) does not overlap with any qualified lower strip 53 (indexed by s), then that upper strip 54 is considered as the beginning of a new whole particle 50, and is reconstructed and assigned an s index number corresponding to the next higher number for the total whole particle count number S(p). The next higher particle count number is simply the former count value increased by one; i.e., S(p)=S(p)+1. Then the next strip 54 (indexed by m) on the line p is tested (incrementing the "m") until all the strips on the line have been tested, i.e., m=M(p). After the data for all the strips on a scanning line has been reconstructed that line is considered reconstructed, and the p loop is then incremented and reentered (until the last p line is reconstructed, i.e., p=P).

The special processing of data for that first horizontal scanning line that contains at least one particle strip line (i.e., the p line where t=1) is indicated by the block 80 of FIG. 6B. In general, this first line is treated similarly to a line p that is preceded by a line p−1 containing no particle strips. As there are no preceding lines containing particle strips, nor any particles at all below this first line (where t=1), the particles strips are considered to be the start of new particles and new particle numbers (s) identical in value to the strip numbers (m) are assigned to the strip X-axis locations and areas.

The foregoing flow diagrams are merely exemplary, and are not intended to limit the programming methods that may be carried out to practice the method of the present invention. More complicated programming (of a level within the range of those skilled in the art, e.g., most computer programmers) would be needed to process particles of unusual shape (e.g., Rorschach Test shapes); the flow charts presented will be adequate for particles of compact shape such as the particle 50 as shown in FIG. 2.

As can be seen from the description of how the particle size detector apparatus 10 operates, it is entirely dependent upon finding the correct edge detection current level. The exact level will be a function of the reflectance and surfaces roughness of the particles being detected. Aluminum particles attached to clear adhesive tape provide a positive (reflective) signal; while AP and HMX particles attached to clear adhesive tape provide negative (transmissive) signals. Thus it is possible to distinguish between the different particles types. Selecting the proper wavelength of laser can exaggerate differences, thereby permitting simpler and more reliable detection. In addition it is possible to place a photodetector beneath a sample, thereby collecting absorption data on a per particle basis.

Although the above description contains many specificities these should not be construed as limiting the scope of the method of the present invention, to which variations and improvements may be made without departing from the true spirit of the invention, but rather as an exemplification of one preferred embodiment thereof. Accordingly, the scope of the invention should be determined not by the embodiment illustrated, but by the appended claims and their legal equivalents.

That which is claimed is:

1. A method for counting the total number of solid particles and for measuring the cross-sectional area of each solid particle contained in a sample of a solids-loaded plastic matrix material, utilizing an interfacing electronics package to place a laser scanner under the control of a computer, comprising the steps of:

gathering a first line of data points representing leading and trailing particle strip edge location data;

processing the data associated with the first line to determine the number of particle strips on the first line and the area of each strip;

storing the edge location data and areas of the particle strips on the first line by strip number and line number identification;

gathering a second line of data points representing leading and trailing particle strip edge location data;

processing the data associated with the second line to determine the number of particle strips on the second line and the area of each strip;

storing the edge location data and areas of the particle strips on the second line by strip number and line number identification;

testing for strip overlapping by comparing the edge location data of strips on the second line with strips on the first line;

gathering a next line of data points representing leading and trailing particle strip edge location data;

processing the data associated with the next line to determine the number of particle strips on the next line and the area of each strip;

storing the edge location data and areas of the particle strips on the next line by strip number and line number identification;

testing for strip overlapping by comparing the edge location data of strips on the next line with strips on the preceding line;

repeating the above sequence of gathering, processing, storing, and testing steps for each successive line of data until the data for all the lines have been gathered, processed, stored, and tested;

associating the data from sequentially overlapping particle strips with a particular whole particle;

calculating the cross-sectional area of each whole particle; and counting the number of particles.

* * * * *